United States Patent [19]

Larson et al.

[11] 4,453,963
[45] Jun. 12, 1984

[54] METHOD AND APPARATUS FOR CONTROLLING THE DELIVERY OF GOBS TO A SECTION OF A GLASSWARE FORMING MACHINE

[75] Inventors: John P. Larson, Granby; Robert J. Japenga, Simsbury, both of Conn.

[73] Assignee: Emhart Industries, Inc., Farmington, Conn.

[21] Appl. No.: 403,245

[22] Filed: Jul. 29, 1982

[51] Int. Cl.³ .............................................. C03B 7/16
[52] U.S. Cl. ........................................ 65/29; 65/159; 65/163; 65/164; 65/DIG. 13; 364/473; 364/476
[58] Field of Search .................... 65/29, 159, 163, 164, 65/DIG. 13; 364/473, 476

[56] References Cited

U.S. PATENT DOCUMENTS

| | | | |
|---|---|---|---|
| 2,955,383 | 10/1960 | Lauck | 65/159 X |
| 4,266,961 | 5/1981 | Wood | 65/29 |

*Primary Examiner*—Arthur D. Kellogg
*Attorney, Agent, or Firm*—Gene Warzecha

[57] ABSTRACT

A method and apparatus for controlling the delivery of gobs to each section of a multiple section glassware forming machine to assure that no one section can authorize the delivery of a gob of molten glass to any other section. The invention discloses means for monitoring the time of occurrence within a machine cycle of the delivery enable pulse from each section and for determining whether this delivery enable pulse occurs within a predetermined time window. In the event either the leading or trailing edge of this pulse occur outside predetermined time windows, the gob interceptor associated with the machine is activated to reject the gobs intended for that section. The invention also discloses means for monitoring the motion of a gob interceptor to provide assurance to an operator that the interceptor has moved to either a delivery or intercept position in a timely manner. The time lag between a command to the interceptor and the interceptor's actual arrival at a predetermined position is monitored and it exceeds a predetermined value a command is given to the retract mechanism associated with the gob distributor to retract the distributor to prevent delivery of gobs to all sections of the machine.

15 Claims, 8 Drawing Figures

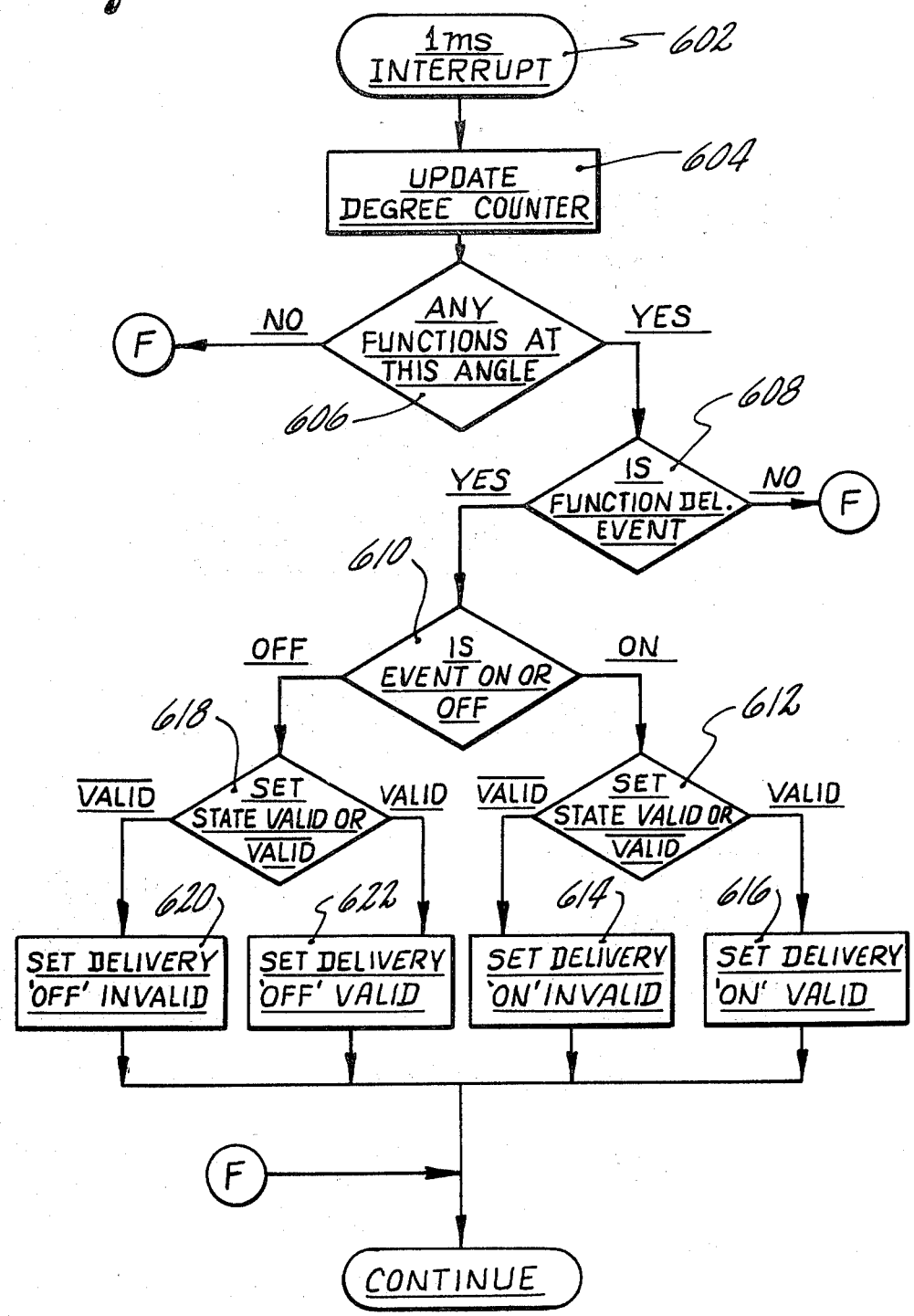
Fig. 6 DELIVERY CONTROL EVENT DRIVER

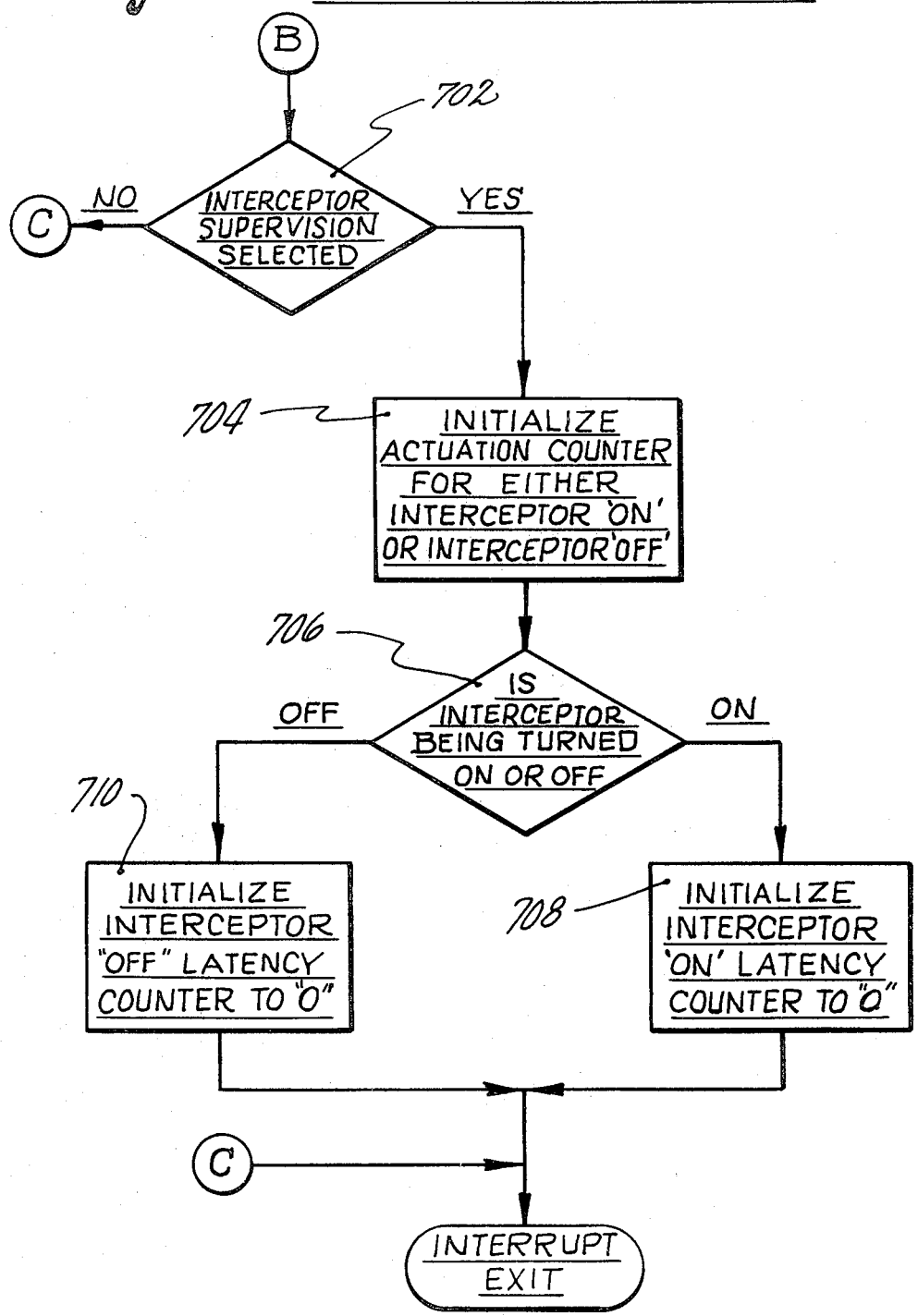

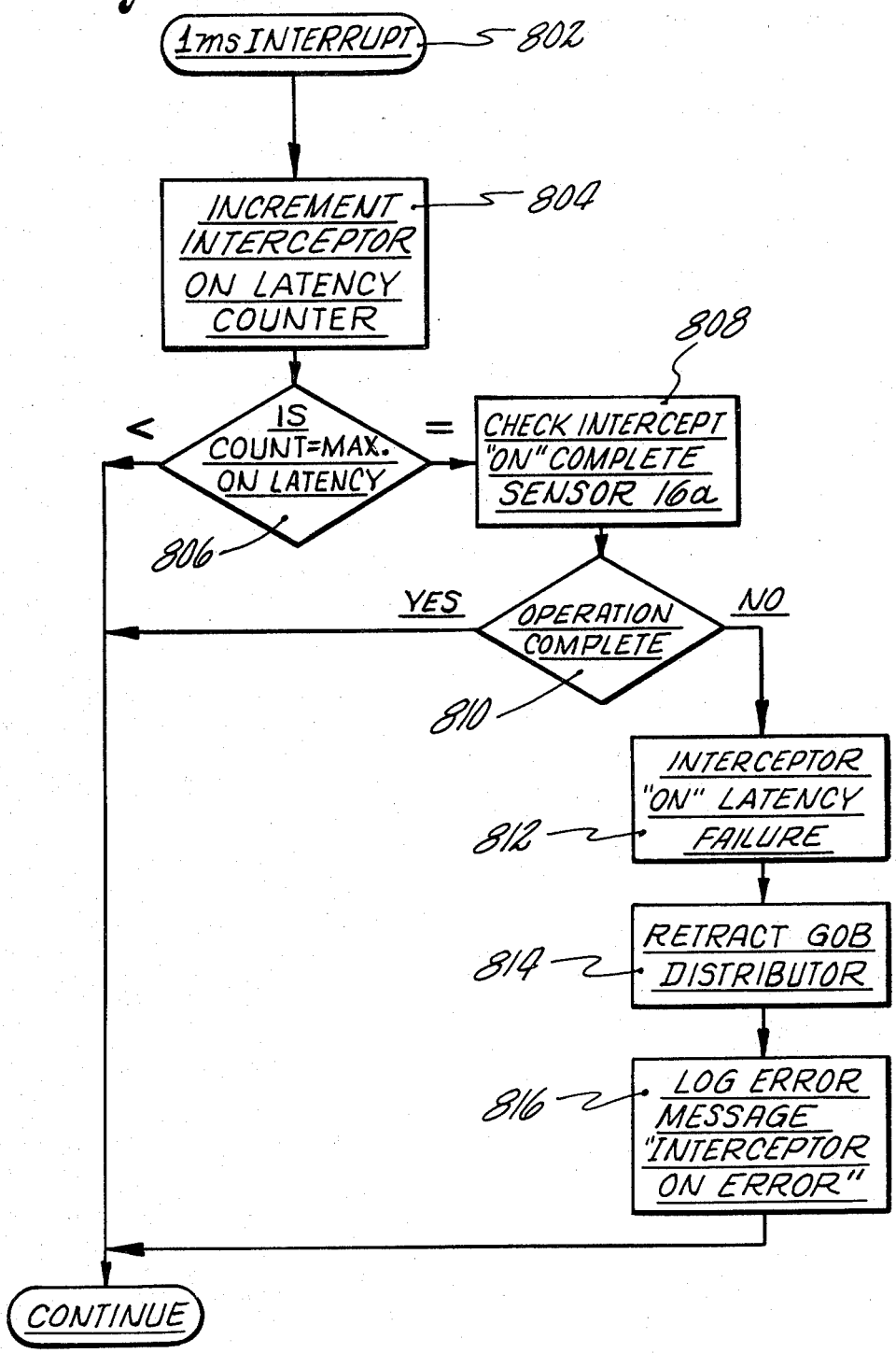

METHOD AND APPARATUS FOR CONTROLLING THE DELIVERY OF GOBS TO A SECTION OF A GLASSWARE FORMING MACHINE

BACKGROUND OF THE INVENTION

1. Field of the Invention

The invention relates generally to devices for controlling the operation of various components of glassware forming machines. More specifically, the invention relates to a system for controlling the delivery of gobs of molten glass to sections of a glassware forming machine.

2. Description of the Prior Art

Prior art glassware forming machines of the individual section type form glassware from gobs of molten glass by the cyclic performance of a predetermined series of steps in each section of the machine. Each section generally contains one or more sets of blank molds for receiving one gob per set, means for performing a predetermined series of steps prior to transferring a parison to one or more corresponding sets of blow molds within that section and means for performing another predetermined series of steps to form a final article of glassware. Each section periodically performs an identical series of steps although sequentially in a predetermined firing order at phased times within the cycle of operation of the machine. In single gob machines, one gob is periodically distributed to each section which then produces one glassware article therefrom. In double gob machines two gobs are simultaneously distributed to each section which contains two sets of molds and associated components for producing one glassware article from each gob. Triple gob machines also exist in the prior art.

These glassware forming machines generally operate in conjunction with a cyclically oscillating gob distributor for periodically and sequentially distributing one or more gobs of molten glass to each section, a feeder serving as a source of one or more streams of molten glass, shears for cutting each stream into gobs and an interceptor associated with each stream and interposed between the shears and the gob distributor for occasionally, as needed, intercepting the gobs to reject them and prevent them from passing to the distributor and on to a particular section. While the interceptor is sometimes considered as part of the gob distributor, as used herein it will be considered a separate mechanism.

The interceptor is normally held retracted out of the way to enable the gobs to pass to the gob distributor. The motion of the interceptor between a retracted delivery position allowing the gobs to pass, and an extended intercept position, rejecting gobs to a cullet chute, is controlled by a delivery enable pulse signal associated with each section of the glassware forming machine. The delivery enable pulse of a particular section is turned on at one predetermined point of the machine cycle and off at another predetermined point. During the on time a gob may be delivered to that section. Those skilled in the art will understand that gob delivery to that section at any other time must not occur because the section will be performing various other functions in order to produce finished glassware and will not be able to accept any gob. Prior art glassware forming machine control systems have attempted to solve the problem of inadvertent delivery of a gob (to a section not ready to accept it) by moving the interceptor to intercept the gob during all times of a section's cycle except during the on time of that section's delivery enable pulse.

The timing controller associated with each section outputs a delivery enable pulse to the interceptor during a predetermined time in that respective section's cycle. The delivery enable pulses from successively phased sections occur sequentially to prevent interference between sections. The net effect could be that the interceptor would oscillate between intercept and delivery positions once during each section cycle. As a practical matter the delivery enable pulses are sufficiently long to abut each other in time to prevent such oscillation, thus saving wear and tear on the mechanical interceptor. In a 10-section machine, for example, each delivery enable pulse will be 36° wide (with respect to the machine cycle) which will produce a continuous level signal to the interceptor in order to prevent it from oscillating. Each section produces a 36° wide delivery enable pulse, all of the pulses abutting to produce this continuous level signal. While delivery of the gob is not theoretically possible at all times during this 36° period because of the occasional interference and motion of various components within the section, it is, nevertheless, desirable not to have the interceptor oscillate. Because of the continuous level signal there is the possibility that a gob may be delivered to a section at a point in time when the section is unable to accept it.

Even if there was no continuous level signal and the interceptor oscillated between the intercept and delivery positions there is the possibility that a delivery enable pulse from one section may occur at an improper time and cause the interceptor to be held in the delivery position while the gob was being delivered to another, inactive section. There is a need in the prior art for an apparatus to monitor the delivery enable pulses of the various sections to assure that the pulse from one section does not enable gob delivery to another section that is inactive or is otherwise unable to receive the gob.

Furthermore, since the operation of the gob distributor is synchronized to operation of the machine rather then to any individual section, there is a possibility that gobs may be continued to be delivered to various sections of the machine if the interceptor is not in the intercept position. Thus, there is a need for a device to monitor the position of the interceptor to shut down delivery of gobs to all sections if the interceptor has been commanded to go to but is not in the intercept position. If the interceptor has been commanded by, for example, the absence of a delivery enable pulse from a section that has been shut down for maintenance, swabbing, etc., the interceptor must move to the intercept position or else molten glass may be delivered to the inactive section with hazardous consequences. Since such a failure of the interceptor is very serious, safety measures must be taken to prevent gob delivery to all sections until the problem is corrected.

Prior art electronic or other control systems do not perform any gob delivery control function or interceptor monitoring function. Relevant prior art control systems include non-programmable electronic control means individual to each section (U.S. Pat. No. 3,762,907); a programmable machine controller utilizing storage means for storing the times when machine components are to be actuated, and comparator means for comparing the cycle time with the component actuating times to provide actuating signals upon positive comparison (U.S. Pat. No. 3,969,703); a programmable controller utilizing machine supervisory control means to load program and timing data into a storage means associated with each section (U.S. Pat. No. 4,152,134); a programmable section controller utilizing storage means for storing signals corresponding to the on/off status of component parts (U.S. Pat. No. 4,247,317); and a method and aparatus for performing a predetermined series of steps to freeze a parison for examination purposes (U.S. Pat. No. 4,141,711).

SUMMARY OF THE INVENTION

The preferred embodiment of the invention disclosed herein comprises a microprocessor based delivery control system for controlling the delivery of at least one gob of molten glass to each section of multiple section glassware forming machine comprising:

timing means for producing a reference point in the cycle of operation of said machine;

means connected to said timing means and to each of said sections for producing a respective delivery enable pulse signal during respective predetermined times relative to said reference point, each said delivery enable signal corresponding to a respective section;

means for producing a plurality of predetermined first time periods relative to said machine cycle, each respectively associated with the start of one of said delivery enable signals;

means for producing a plurality of predetermined second time periods relative to said machine cycle, each respectively associated with the end of said delivery enable signals;

means responsive to said delivery enable signal producing means and to first and second time period producing means for determining if any one of said starts occur within its respective first time period and if any one of said ends occurs within it respective second time period, and for producing with respect to each respective section, after activation of said system, a first signal upon the occurrence of said start within its respective first time period and for continuing said first signal with respect to its respective section until the occurrence of that section's start or end outside its respective time period and thereafter producing and continuing a second signal with respect to that section;

means responsive to each of said first signals for enabling gob delivery to its respective section and responsive to each of said second signals for disabling same.

The invention also includes an interceptor monitoring apparatus for sensing the arrival of the interceptor at a delivery and intercept position. If the interceptor does not arrive at either of these positions within a predetermined time after an appropriate command the invention will cause the gob distributor to be retracted to prevent gob delivery to all sections.

BRIEF DESCRIPTION OF THE DRAWINGS

FIG. 4 through FIG. 6 show various flow charts describing the operation of a portion of the invention;

FIGS. 7 and 8 show flow charts describing the operation of that portion of the invention dealing with interceptor supervision.

DESCRIPTION OF THE PREFERRED EMBODIMENT

Figure 1:
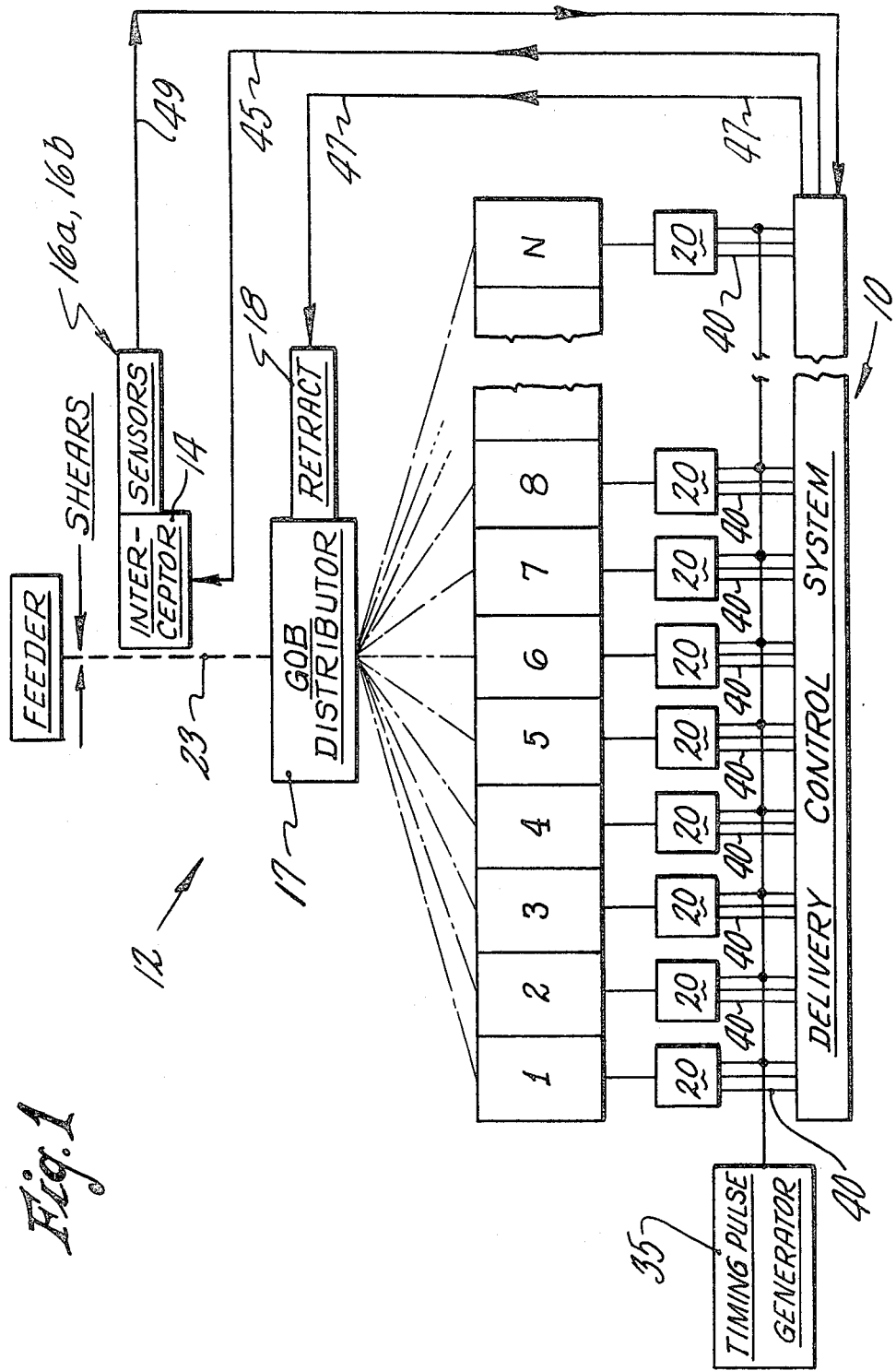
FIG. 1 shows a diagrammatic representation of the delivery control system embodying the present invention in relationship to other components of a glassware forming machine.

Referring now to FIG. 1 there is shown a diagrammatic representation of a delivery control system 10 interconnected with a glassware forming machine 12. Machine 12 is also operatively connected to gob interceptor 14, an interceptor activation sensors 16a and 16b and a gob distributor 17 and its retract mechanism 18. Machine 12 comprises a plurality of individual sections labeled 1-N, the timing of each section being controlled by identical controllers 20, each section forming glassware using, for example, the blow-and-blow process.

Figure 2:
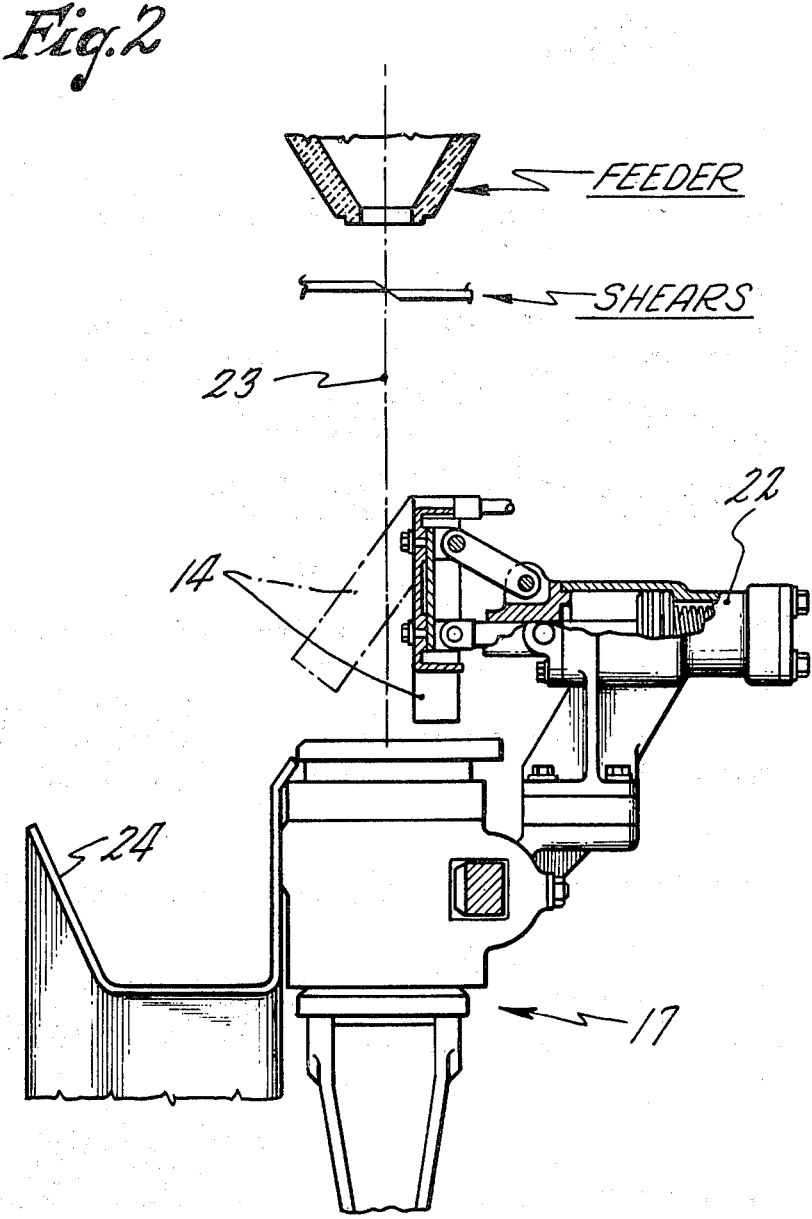
FIG. 2 shows a diagrammatic elevational view of one type of gob interceptor in relationship to other components associated with a glassware forming machine.

The feeder, shears, interceptor and distributor associated with machine 12 are shown in greater detail in FIG. 2. In normal operation interceptor 14 is held retracted by interceptor actuator mechanism 22 to enable a gob to drop along line 23 from the feeder to distributor 17. When a gob is to be intercepted, interceptor actuator mechanism 22 causes interceptor 14 to be extended to the intercept position shown in phantom in FIG. 2, to deflect a gob into cullet chute 24.

Figure 3:
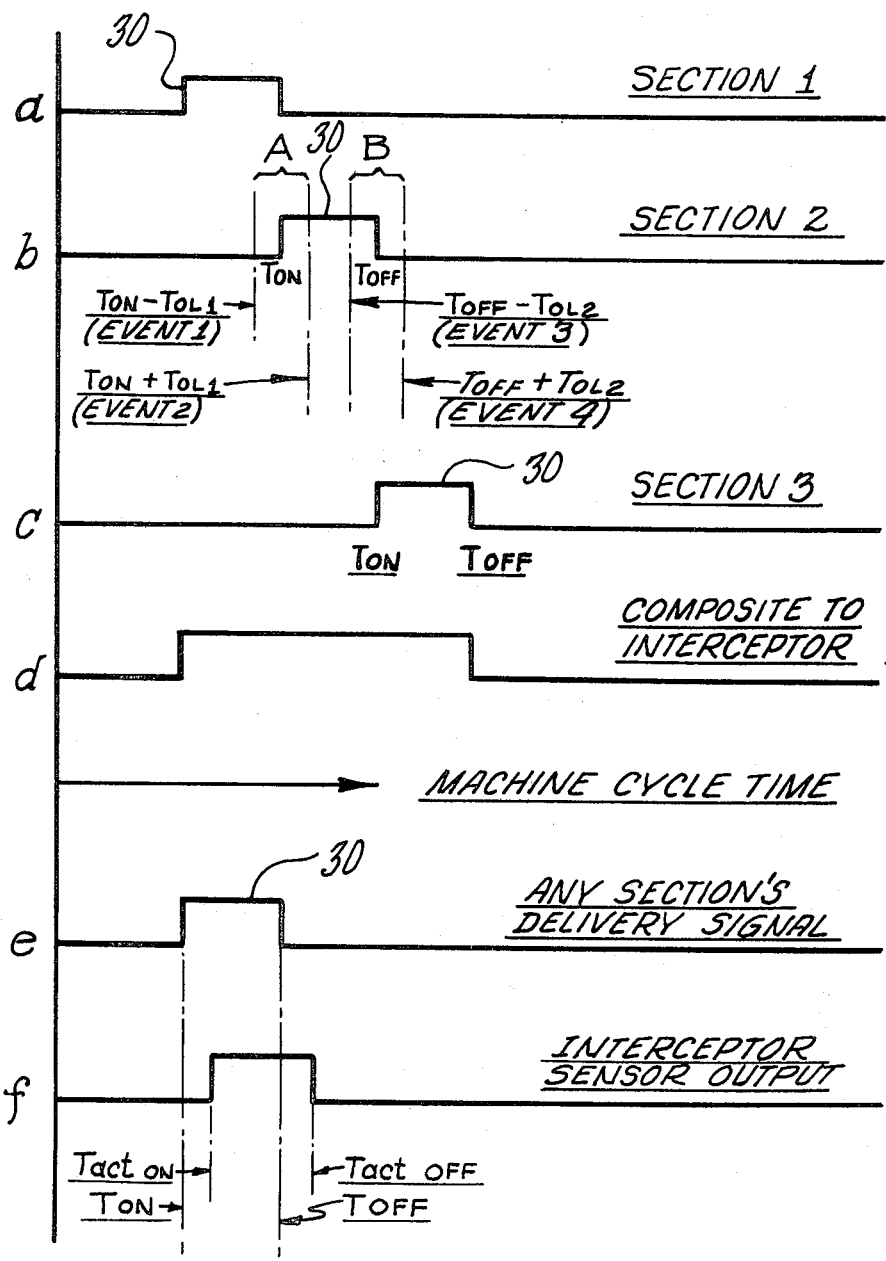
FIG. 3 shows graphical representations of the timing of various signals used in and produced by the invention.

In normal operation, each controller 20 cyclically produces respective delivery activation signals 30, best seen in FIGS. 3a, 3b and 3c. It will be understood that each section produces phased signals 30 although only three are shown here. Delivery control system 10 outputs to the interceptor the composite signal shown in FIG. 3d, unless certain conditions occur to turn the interceptor off, i.e. put it into the intercept position. The times shown in FIG. 3 are with respect to the machine cycle, thus each section's signal 30 may extend for a 36° portion of the machine cycle for a 10 section machine. Each signal 30 operates similarly to the others except for the time of occurrence, therefore only one signal 30 will be described.

Signal 30 is a pulse going on at $T_{on}$ and off at $T_{off}$. Both $T_{on}$ and $T_{off}$ are times relative to the machine cycle as opposed to the section cycle and vary among the sections. When high, signal 30 causes interceptoractuator mechanism 22 to retract interceptor 14 and hold it in retracted position.

As will be seen below, system 10 produces time windows A and B as seen in FIG. 3b (not to scale) and supervises the occurrence of signal 30 to assure that its leading and trailing edges occur within the respective windows. Window A is defined as a time period from $T_{on}-tol_1$ to $T_{on}+tol_1$ and window B is defined as the time period from $T_{off}-tol_2$ to $T_{off}+tol_2$. The values $tol_1$ and $tol_2$ are predetermined tolerances, programmed into system 10 by the machine operator (or preset in read only memory) and may be, for example, on the order of 1 to 2 degrees.

While the duration of signal 30 from a section may be 36°, in practice actual gob delivery can occur to that section only during a much smaller time period because of the movements of various section components. Window A defines that smaller time period. Also, it is desirable that $T_{on}+tol_1$ does not overlap $T_{off}-tol_2$ because of the interference presented by these components. As will be recognized by those skilled in the art, these moving parts (for example, a baffle, funnel, etc.) may interfere with clear delivery of the gob into the blank mold. It is also important that signal 30 not go off before $T_{off}-tol_2$. This might cause the interceptor to be turned off while a gob is coming down for delivery to the next succeeding section. This would propel the molten gob into the plant with obvious hazardous consequences.

Returning to FIG. 1, the timing pulse generator 35 provides timing pulses for synchronizing the section controllers 20 and for providing a machine cycle reference. The delivery enable pulse signal of each controller 20 passes via lines 40 to system 10 which ultimately produces a composite signal (FIG. 3d) to interceptor 14 via line 45. If the leading or trailing edge of one of the signals 30 from a section should happen to occur outside its respective allowable time window, system 10 will turn the composite signal off and command interceptor 14 via line 45 into the intercept position. System 10 also monitors the intercept and delivery positions of the interceptor via line 45. If the interceptor does not reach the position to which it has been commanded within a predetermined time, system 10 will command gob distributor retract mechanism 18 via line 47 to retract.

In the preferred embodiment of the invention delivery control system 10 is programmable and operates in conjunction with a programmable machine controller for controlling the timing of the various components within a glassware forming machine. The machine controller (not shown) is controlled by a main program and system 10 is controlled by a subroutine, the flow charts of which are shown in FIGS. 4–8. This subroutine is interrupt driven and monitors and controls delivery to each section of the machine although only operation with respect to one section will be described herein.

Figure 4:
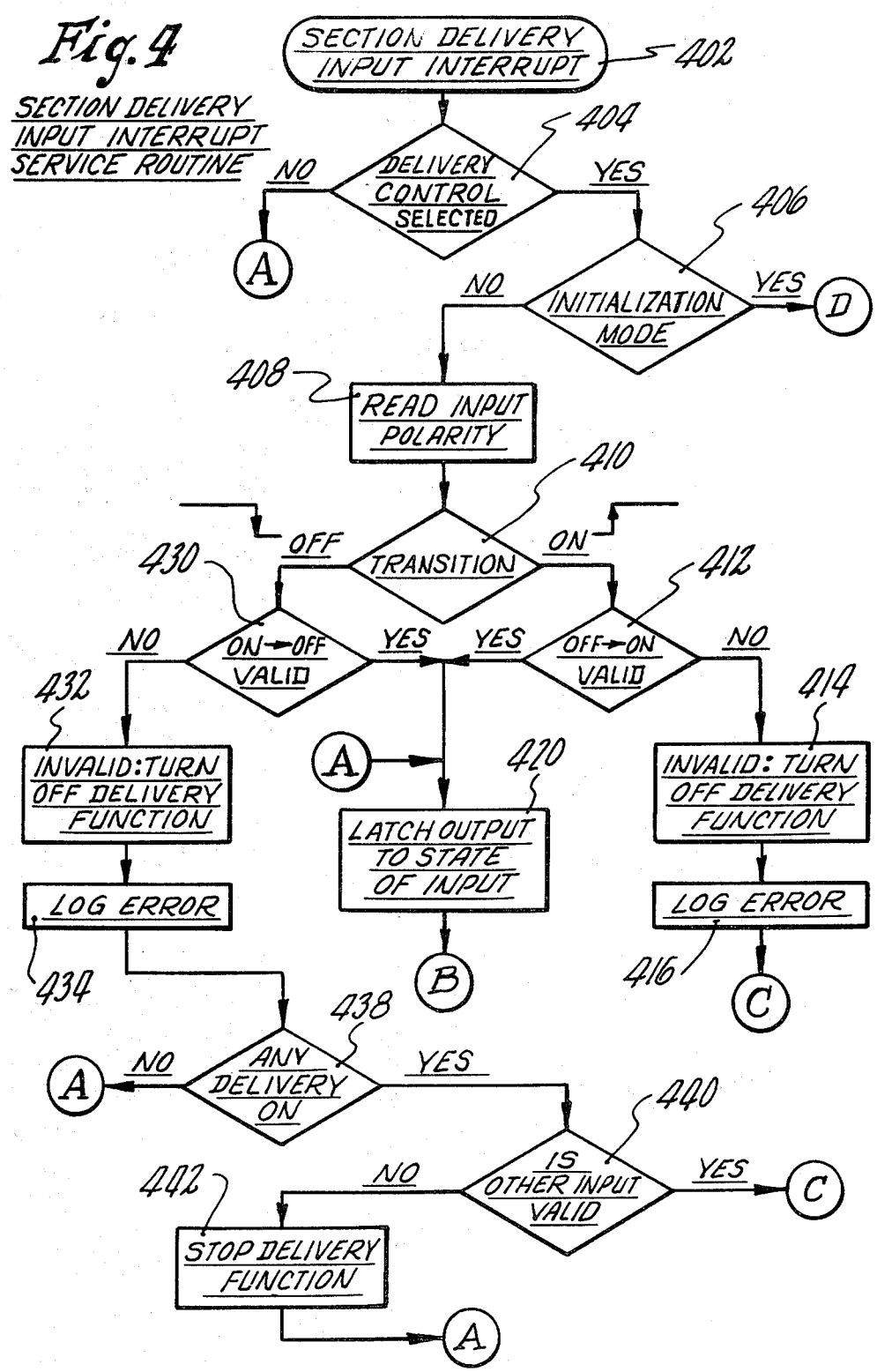

FIG. 4 shows the flow chart of a section delivery input interrupt service routine. A transition monitoring circuit 402 is used to monitor signal 30 from each section and produce an interrupt to the main program to initiate the routine at each transition (leading or trailing edge) of signal 30. The routine is sensitive to level transitions rather than to steady state conditions and the operation of the routine described below is designed to determine relevant level transitions.

At each interrupt the routine proceeds to decision block 404 to determine whether the delivery control function was selected for the particular section active at the time of the interrupt. This block enables machine operation without the delivery control function being enabled. If delivery control was not selected, the program branches to point A which will be discussed below. If it was, the program branches to decision block 406 to determine if the initialization mode has been completed. The initialization of system 10 occurs automatically for the first machine cycle after the operator selects the delivery control function. The first time any transition interrupt causes the routine to run, the program will run through decision block 406, branch to point D and proceed along a subroutine more clearly shown in FIG. 5. The second and subsequent times the program runs it will branch to processing block 408 where the polarity of signal 30 is read to determine whether it is high (on) or low (off). Decision block 410 then determines which transition caused the interrupt. If signal 30 has transitioned from off to on, the program branches to decision block 412 to determine if the transition is valid. That is, whether or not the transition is within a valid window. If the transition is invalid, the program branches to processing block 414 which concludes that the delivery "on" timing is incorrect and turns off the section's delivery function. The program then proceeds to processing block 416, causing an error message to be logged into an appropriate display, and to point C, best seen in FIG. 7.

Returning now to decision block 412, in the event the on to off transition is determined valid the program branches to processing block 420 which latches the system 10 output to the interceptor 14 to the state of signal 30, whichever polarity has been read by block 408. The program then proceeds to Point B which initiates the interceptor activation control interrupt service routine more fully explained in FIG. 7.

Returning now to decision block 410, in the event signal 30 is determined to be off the program branches to decision block 430 which functions similarly to decision block 412 and determines whether the off status is a result of a valid transition. If it is, the program branches to processing block 420 and proceeds accordingly as described above. In the event the transition is invalid the program branches to processing blocks 432 and 434 to turn off the section's delivery function and log an error message. Also, the program proceeds to block 438 to determine if any other section's delivery pulse is on. If not, the program continues to point A. If so, decision block 440 then determines if the other on delivery pulses are valid. If not, block 442 stops the delivery pulse of the other invalid section or sections and the program proceeds to point A. If so, the program proceeds to point C the output to the interceptor being left on. Blocks 438 to 442 prevent situations which might erroneously turn off the interceptor during valid delivery periods to other sections (e.g. when the delivery pulse of one section turns off after window B).

It will be noted that an invalid delivery "on" signal directs the program to point C while an invalid delivery "off" signal directs the program to point A, even though both invalid signals cause the section's delivery function to be disabled. The reason for the distinction is that if an error occurs in the timing of the trailing edge of a signal 30 the interceptor will be commanded to go to an intercept position from a previous delivery position. To assure that the interceptor is turned off and the "off" invalidity is propagated through to the interceptor, process block 432 turns off the section's delivery function and, as an additional safety feature, the program goes through point A to block 420 setting the system 10 delivery output to interceptor 14 to the off position. If the error, on the other hand, occurs in the leading edge, the polarity of the signal before the transition was low indicating the interceptor was off, so it should be left off. If the program were to branch to block 420 the system 10 delivery output would be set high which would contradict the invalidity determined by block 412. This is prevented by branching the program to point C after setting the section's delivery function off. Setting a section's delivery function off has the effect of leaving it off for all future cycles of that section until reset by the operator (by means not shown).

Figure 5:
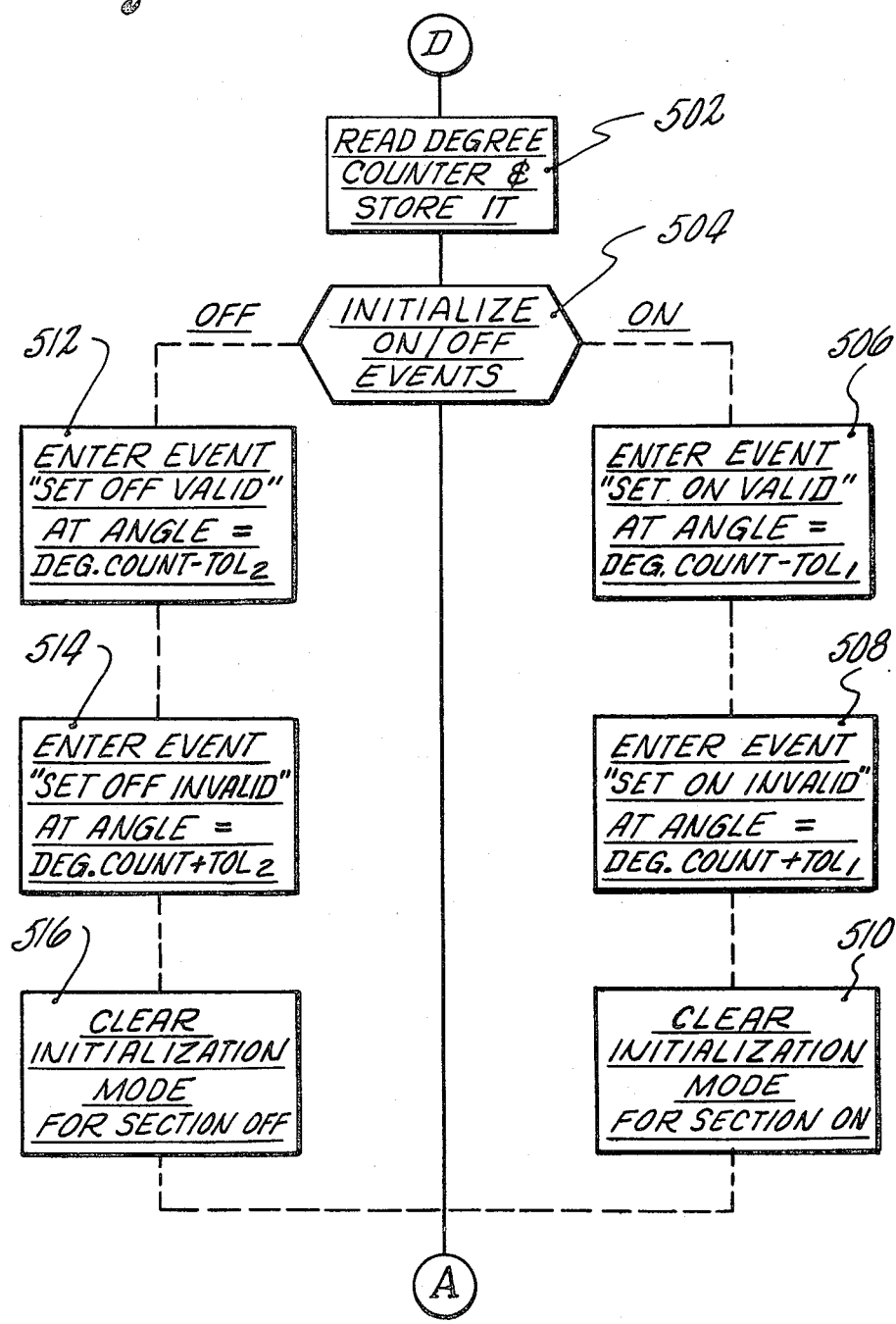

Referring now to FIG. 5, the operation of the program will be described from point D on FIG. 4. If decision block 406 indicates that the operator has selected the delivery control mode for the section and the current cycle is the first one after such selection, the program proceeds to processing block 502 to read a degree counter representative of the angular position of the machine cycle at the time of the interrupt. The operator would activate delivery control when the particular section was running properly, so the various interrupt times would be acceptable. The program then proceeds to predefined process block 504 which performs a predetermined series of steps (shown in phantom) to initialize both "on" and "off" events, as follows:

During the first cycle following selection of the delivery control function the system assigns a degree value to a plurality of events associated with each section. In the preferred embodiment each section is allocated four delivery events: (1) set on valid, (2) set on invalid, (3) set off valid, and (4) set off invalid. In a 10 section machine there would be total of forty events. As each transition interrupt occurs (FIG. 4) the program branches to point D (FIG. 5) to set an initial condition for that particular transition. For example, if the transition is an off to on transition and the initialization mode is selected by block 406, predefined process block 504 would perform the functions in the right branch. That is, process block 506 would enter into memory an event labelled "set on valid" corresponding to a machine cycle angle equal to the degree counter number minus $tol_1$. The program proceeds to process block 508 to enter an event "set on invalid" at an angle=degree counter+$tol_1$. The program then proceeds to processing block 510 to clear the selection of the initialization mode for the "on" events for the chosen section and returns the program to point A in FIG. 4. After all events have been initialized, decision block 406 will branch to process block 408 at each interrupt.

A parallel procedure is followed with respect to the "off" events. The program proceeds to processing blocks 512, 514 and 516 to enter an event "set off valid" at an angle=degree counter−$tol_2$ and an event "set off invalid" at an angle= degree counter+$tol_2$. All events are stored in a circular linked list format and, as will be seen below, each event is sequentially accessed when the current machine angle corresponds to the event's angle of operation.

Referring now to FIG. 6, there is shown the flow chart of the operation of the delivery control event drivers which set the events to define valid time windows. Initially, it will be understood that the main program is driven by a 1 msec interrupt diagrammatically shown at point 602. At each interrupt the main program branches to processing block 604 to update a degree counter to the then current machine angle relative to the timing reference pulse from pulse operator 35. The main program then branches to decision block 606 to determine if there are any machine functions at this angle. If not, the program branches to "continue" via point F, explained below. If so, the main program branches to a subroutine via decision block 608 to determine if the function is a delivery control event (i.e. an event set in FIG. 5). If it is not, the routine branches to "continue" and returns control to the main program until the next interrupt. If it is, the program branches to decision block 610 to determine if the function is an on event or an off event (i.e. events 1 and 2 or events 3 and 4, best seen in FIG. 3b). If on, the program branches to decision block 612 to determine if the function is valid (i.e. event 1) or invalid (i.e. event 2). Processing blocks 614 and 616 set the delivery states accordingly in the data structure and return control to the main program. The delivery states thus represents window A to which decision block 412 (FIG. 4) compares the time of the transition to determine if it is or not. Descision block 618 and processing blocks 620 and 622 perform a similar function with respect to the window B utilized by decision block 430 (FIG. 4) to determine validity of an off transition. While the delivery states are chosen herein to be updated at every interrupt the system would also operate properly if the delivery states were set only once in a look-up table.

In operation, while the machine is running, at each 1 msec interrupt the program checks to see if a delivery control event is called for at a machine angle. If so, the program sets the delivery state accordingly ("on" valid or invalid, or "off" valid or invalid) and when the transition interrupt (FIG. 4) occurs, blocks 412 or 430 compare the transition to this delivery state to determine validity.

Referring now to FIG. 7, there is shown the flow chart for the interceptor activation control interrupt service routine. This routine is initiated from Point B, FIG. 4, after each section's delivery enable pulse to the interceptor has been latched either on or off. Decision block 702 first determines if interceptor actuation supervision has been selected. If not, the routine branches to point C to "interrupt exit" and continues. If so, the routine branches to process block 704 to initialize an activation counter whether the interceptor is being turned on or off. Decision block 706 then determines whether the interceptor is being turned on or off and initializes an "on" latency counter to zero via block 708 or an "off" latency counter to zero via block 710, as the case may be. The program then continues to "interrupt exit," the intercept control function being more fully described in FIG. 8.

A 1 msec interrupt initiates the routine at point 802. The routine services both on and off intercept control functions but, since they are similar, only the on function will be described. A diagrammatic representation of the intercept control timing function is shown in FIGS. 3e and 3f. FIG. 3e represents a section's delivery enable pulse 30 and FIG. 3f represents the interceptor's response thereto. (Note that if there is no transition in the delivery enable pulse the interceptor will not change its state and will therefore not need to be monitored). There is a time lag between the two due to inertia, if for no other reason. The time at which the interceptor reaches the intercept position is defined as $T_{act\ off}$ and is determined by the output of sensor 16a which monitors the proper intercept position. The time at which the interceptor reaches a delivery position is defined as $T_{act\ on}$ and is determined by sensor 16b which monitors the proper delivery position. $T_{act\ on}$ and $T_{act\ off}$ should be less than some maximum limits which may be preprogrammed or programmed by the operator.

Processing block 804 increments the "on" latency counter by one and decision block 806 then determines if the count in the "on" latency counter is less than or equal to the maximum permitted (i.e. if $T_{act\ on} - T_{on}$ is less than or equal to maximum). If the count equals the maximum, the routine proceeds to processing block 808 to check interceptor position sensor 16a to determine, in decision block 810, if the interceptor has reached the intercept position. If either the count is less than the maximum or if the interceptor has reached the intercept position, the routine branches to "continue." If not, processing block 812 indicates an interceptor failure to block 814 which causes gob distributor 17 to retract. Processing block 816 then logs an error message and returns the routine to "continue." The operator must then take appropriate action.

While the preferred embodiment has been disclosed relative to an oscillating type of gob distributor, the invention is also suitable for reciprocating scoop type gob distributors (not shown) which operate without a separate gob interceptor.

Those skilled in the art will understand that numerous other modifications and improvements may be made to the preferred embodi-ment of the invention disclosed herein without departing from the spirit and scope thereof.

What is claimed is:

1. A system for selectively enabling periodic delivery of at least one gob of molten glass to each section of a multiple section glassware forming machine, comprising:

timing means for producing a reference point in the cycle of operation of said machine;

means connected to said timing means and to each of said sections for producing a respective delivery enable pulse signal during respective predetermined times relative to said reference point, each said delivery enable signal corresponding to a respective section;

means for producing a plurality of predetermined first time windows, each respectively associated with the leading edge of one of said delivery enable signals;

means for producing a plurality of predetermined second time windows, each respectively associated with the trailing edge of one of said delivery enable signals;

means responsive to said delivery enable signal producing means and to said first and second time window producing means for determining if any one of said leading edges occurs within its respective first time window and if any one of said trailing edges occurs within its respective second time window, and for producing after activation of said system, with respect to each respective section a first signal upon the first occurrence of said leading edges within its respective first time window and for continuing said first signal with respect to its respective section until that section's leading edge or trailing edge occurs outside its respective time window and thereafter producing and continuing a second signal with respect to that section;

means responsive to each of said first signals for enabling gob delivery to its respective section and responsive to each of said second signals for disabling same.

2. A system according to claim 1 wherein said means responsive to said first and second signals is a gob interceptor interposed adjacent the gob delivery path common to all sections.

3. A system according to claim 1 wherein said means responsive to said first and second signals is a plurality of reciprocating scoops, each respectively associated with one of said sections.

4. A system according to claim 1 further comprising:
means responsive to any one of said second signals for causing said delivery enable signal producing means to cease production of the delivery enable signal responsible for producing said one of said second signals, said cessation continuing until reset.

5. A system for controlling the periodic delivery of at least one gob of molten glass to a section of a multiple section glassware forming machine, said gob being periodically distributed to said section via a cyclically movable gob distributor, a gob interceptor interposed before said gob distributor, said interceptor being movable between a retracted delivery position to enable gob delivery and an extended intercept position to disable gob delivery, said interceptor being retracted in response to a delivery enable pulse signal and extended in response to the absence of said delivery enable signal, said delivery enable signal being turned on at a first predetermined time relative to the cycle of operation of said machine and being turned off at a second predetermined time relative to said cycle, said system comprising:

first means for determining a first predetermined time window relative to said first predetermined time;

second means for determining a second predetermined time window relative to said second predetermined time;

means responsive to said delivery enable signal and said first means for determining if said first predetermined time occurs within said first predetermined time window and for producing a first signal upon such occurrence;

means responsive to said delivery enable signal and said second means for determining if said second predetermined time occurs during said second predetermined time window and for producing a second signal upon such occurrence;

means responsive to said first and second signal producing means for:

(a) causing said interceptor to be in said delivery position upon the first occurrence of said first or second signal after activation of said system and for (b) monitoring said interceptor in said delivery position until either said first or second signal ceases to be produced and for (c) thereafter causing said interceptor to be in said intercept position.

6. A system according to claim 5 further comprising: means responsive to the absence of either said first or second signal for turning off said delivery enable signal until reset.

7. A programmable machine controller for controlling the periodic delivery of at least one gob to each section of a glassware forming machine, each section of said machine being controlled by a section timing controller which produces with respect to its section a delivery enable pulse signal at respective predetermined times relative to the cycle of operation of said machine, said delivery enable signal enabling gob delivery to its respective section when on and disabling said gob delivery when off, said machine provided with interceptor means for selectively intercepting said gob to prevent its delivery to one or more sections, said machine controller comprising:

timing means responsive to said delivery enable signals for determining the time of occurrence of each of said delivery enable signals relative to said machine cycle;

means for producing an allowable time window with respect to each of said delivery enable signals representative of the time in said machine cycle when gob delivery may be permitted to the section, respectively corresponding to said delivery enable signal;

means responsive to said timing means and to said window producing means for determining if a delivery enable signal occurs in a predetermined relationship with respect to its respective time window and for producing a respective signal output upon each such occurrence;

means responsive to said output for causing said interceptor to intercept a gob to prevent its delivery to each section associated with a delivery enable signal which occurs not in conformance with said predetermined relationship.

8. A method for controlling periodic delivery of at least one gob of molten glass to a section of a multiple section glassware forming machine, said gob being periodically distributed to said section via cyclically movable gob distributor, a gob interceptor interposed before said gob distributor, said interceptor being movable between a normal retracted delivery position to enable gob delivery and an extended intercept position to disable gob delivery, said interceptor being retracted in response to a delivery enable pulse signal and extended in response to the absence thereof, said delivery enable signal occurring during a predetermined time period relative to the cycle of operation of said machine, said method comprising the steps of:
monitoring said delivery enable signal;
determining a predetermined first time window relative to the leading edge of said pulse;
determining a predetermined second time window relative to the trailing edge of said pulse;
determining whether (1) said leading edge occurs within said first window and (2) said trailing edge occurs within said second window;
placing said interceptor in said intercept position in the event said leading edge does not occur within said first window or said trailing edge does not occur within said second window.

9. A method according to claim 8 further comprising the step of:
maintaining said interceptor in said intercept position during each portion of said machine cycle during which gob delivery would have otherwise been permitted to said section.

10. A method for controlling periodic delivery of at least one gob of molten glass to each section of a glassware forming machine, a gob being sequentially distributed to each said section via a cyclically movable gob distributor, a gob interceptor interposed before said gob distributor, said interceptor being movable between a normal retracted delivery position to enable gob delivery to a predetermined section and an extended intercept position to disable same, said interceptor being retracted in response to a plurality of delivery enable pulse signals and extended in response to the absence of any one thereof, each of said sections corresponding to one of said delivery enable signals, said delivery enable signals occuring during respective predetermined time periods relative to the cycle of operation of said machine, said method comprising the steps of:
monitoring each of said delivery enable signals;
determining with respect to each of said delivery enable signals a predetermined first time window relative to the leading edge of a signal;
determining with respect to each of said delivery enable signals a predetermined second time window relative to the trailing edge of a signal;
determining with respect to each of said delivery enable signals whether (1) its leading edge occurs within its respective first window and (2) its trailing edge occurs within its respective second window;
placing said interceptor in said intercept position with respect to each responsible section whose corresponding delivery enable signal's leading or trailing edge occur outside their respective windows.

11. A method according to claim 10 further comprising the step of:
maintaining said interceptor in said intercept position during each position of said machine cycle during which gob delivery would have otherwise been permitted to each said responsible section.

12. An interceptor monitoring apparatus for selectively intercepting the periodic delivery of at least one gob of molten glass to all sections of a multiple section glassware forming machine in responsive to an actuating signal, said machine operating with a gob interceptor interposed adjacent the path of said gob above a gob distributor, said interceptor being movable into an intercept position in response to said first signal, said apparatus comprising:
means for monitoring said first signal to determine the time of occurrence thereof;
first transducer means for monitoring said intercept position and for producing a second signal representative of the presence of said interceptor at said intercept position;
means for producing a first predetermined time delay period representative of an allowable response time within which said interceptor must respond;
means responsive to said first transducer means, said first signal monitoring means and said first time delay means for determining if said second signal occurs after said first predetermined time delay period after the occurrence of said first signal and for producing a first output if so;
means responsive to said first output for causing said gob distributor to retract to prevent gob delivery to all sections.

13. An interceptor monitoring apparatus according to claim 12, wherein said interceptor is movable into a delivery position in response to a third signal and further comprising:
means for monitoring said third signal to determine the time of occurrence thereof;
second transducer means for monitoring said delivery position and for producing a fourth signal representative of the presence of said interceptor at said delivery position;
means for producing a second predetermined time delay period representative of an allowable response time within which said interceptor must respond;
means responsive to said second transducer means, said third signal monitoring means and said second time delay means for determining if said second signals occurs after said second predetemined time delay period after the occurrence of said signal and for producing a second signal output if so;
means responsive to said second output for causing said gob distributor to retract to prevent all gob delivery to all sections.

14. A method for controlling the interceptor of a multiple section glassware forming machine, each section of said machine being controlled by a section controller producing a respective delivery enable pulse signal at predetermined times with respect to the cycle of operation of said machine, said interceptor activated by a composite signal comprising each of said respective delivery enable signals, said interceptor movable between a delivery position and an intercept position in response to said composite signal being on or off, respectively, said method comprising the steps of:
- monitoring said composite level signal and sensing each transition therein;
- determining the time of occurrence of said said transition with respect to said machine cycle;
- monitoring the intercept and delivery positions of said interceptor to produce respective signals upon the occurrence of said interceptor at each position;
- determining a first time with respect to said machine cycle when said interceptor reaches said delivery position after a sensed transition from off to on;
- comparing said first time to said sensed transition from off to on to determine if said interceptor has reached said delivery position prior to the expiration of said first time;
- determining a second time with respect to said machine cycle when said interceptor reaches said intercept position after a sensed transition from on to off;
- comparing said second time to said sensed transition from on to off to determine if said interceptor has reached said intercept position prior to the expiration of said second time;
- retracting said gob distributor in the event said interceptor does not arrive at said intercept position prior to the expiration of said second time or at said delivery position prior to the expiration of said first time.

15. In a programmable machine controller for controlling the operation of a glassware forming machine, said machine including a plurality of individual sections for forming glassware from a gob of molten glass delivered to said sections from a source, said machine operatively connected to a gob distributor for sequentially and cyclically distributing at least one gob of molten glass to each of said sections, a gob interceptor interposed between said source and said distributor for selectively enabling each gob to be either delivered to a section or rejected to a cullet chute, a delivery supervision system comprising:
- means associated with each of said sections for producing a delivery enable signal representative of the time within the cycle of operation of said machine when said delivery signal's respective section may accept delivery of a gob;
- means for monitoring each of said delivery enable signals and for placing said interceptor into an intercept position in the event any one of said delivery enable signals occurs outside perdetermined time limits thereby preventing the delivery enable signal associated with one section from effecting gob delivery to the next sequentially activated section.

* * * * *